United States Patent [19]

Ryan et al.

[11] 4,260,299

[45] Apr. 7, 1981

[54] CUTTING TOOLS HAVING COMPOUND CUTTING FACES

[75] Inventors: Arthur B. Ryan, Canandaigua; Gilmore M. Spear, Rochester, both of N.Y.

[73] Assignee: The Gleason Works, Rochester, N.Y.

[21] Appl. No.: 42,391

[22] Filed: May 25, 1979

[51] Int. Cl.³ .............................................. B23P 15/34
[52] U.S. Cl. .................................... 407/115; 407/116; 407/22
[58] Field of Search .................. 407/115, 116, 113, 22

[56] References Cited

U.S. PATENT DOCUMENTS

| 1,820,415 | 8/1931 | Wildhaber | 407/22 |
| 1,892,091 | 12/1932 | Wildhaber | 407/28 |
| 3,354,525 | 11/1967 | Ryan | 407/115 |
| 3,820,211 | 6/1974 | Kus | 407/116 |
| 4,060,881 | 12/1977 | Ryan | 407/22 |
| 4,137,001 | 1/1979 | Fountain | 407/115 |

Primary Examiner—Leonidas Vlachos
Attorney, Agent, or Firm—Morton A. Polster; Ralph E. Harper

[57] ABSTRACT

A gear cutting tool is provided with angular planar surfaces along its front face for providing first and second side rake angles on the tool. The angular planar surfaces do not rquire resharpening when the tool is resharpened.

9 Claims, 12 Drawing Figures

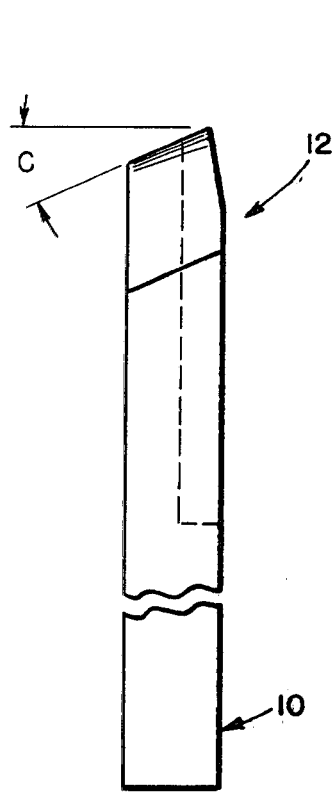
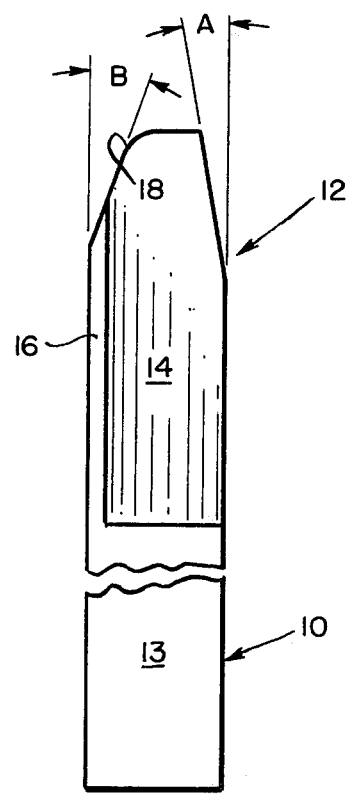
FIG. 1 (PRIOR ART)   FIG. 2 (PRIOR ART)
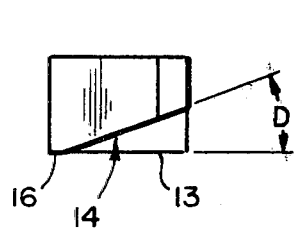
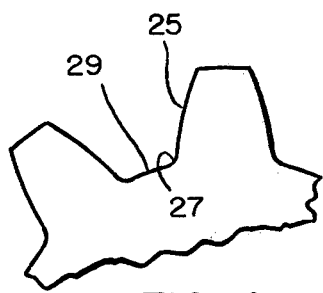
FIG. 3   FIG. 4

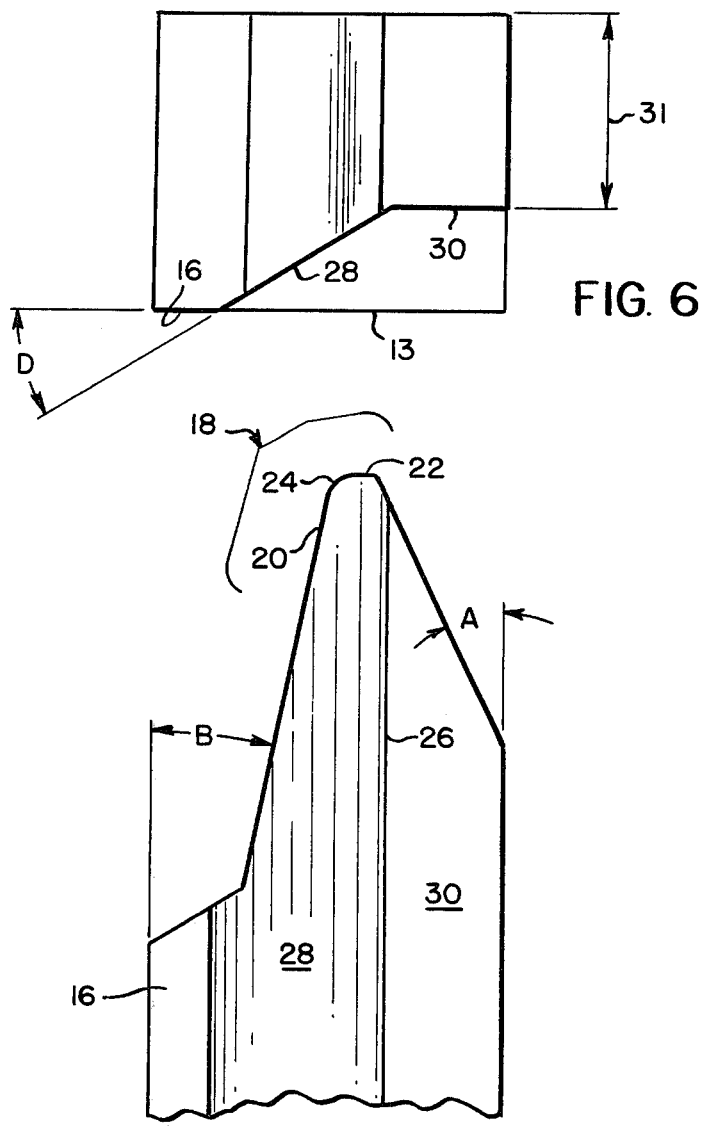

CUTTING TOOLS HAVING COMPOUND CUTTING FACES

BACKGROUND AND BRIEF DESCRIPTION OF INVENTION

This invention relates to improved cutting tools useful for cutting slots in workpieces and is more particularly concerned with improved cutting tools for gear cutting applications.

It is known in the art of gear cutting to provide for cutting tools which can be easily resharpened by their users by simply regrinding a profile on a cutting end of each tool. The cutting face of such a tool does not require resharpening, and this permits a preservation of the cutting face for metallurgical of other types of treatments which improve cutting and wear characteristics of the tool. In addition, it is known to provide in cutting tools of this type a built-in side rake angle of the cutting face relative to the orientation of such tools in radial slots in cutterheads designed to carry a plurality of tools for gear cutting purposes. Built-in rake angles are disclosed, for example, in U.S. Pat. No. 4,060,881 (commonly owned herewith), and the descriptions of that patent are incorporated herein by reference to the extent necessary to provide additional background information regarding the design and usage of certain cutting tools in bevel gear cutting applications. Similar type tools can be used in spur and helical gear cutting applications in which the tools are mounted in a carrier for being brought into engagement with a cylindrical workpiece for forming spur or helical gears.

However, it has been found that there is a problem of obtaining desired tool geometry for certain required side rake angles that are needed for cutting different degrees of softness of workpiece material. When cutting a workpiece formed from a softer steel than is conventionally used, it is desirable to provide a greater side rake angle on the cutting faces of the tools operating on such a workpiece. As shown and described in U.S. Pat. No. 4,060,881, the side rake angle of certain forms of tooling can be included thereon by simply grinding a prefered angle on the face of the tool at the time of its original manufacture. Thereafter, the tool is periodically resharpened without regrinding the cutting face portion thereof. A single and preferred side rake angle for any given tool satisfies many cutting applications, however, side rake angles which are substantially greater than those normally used result in a significant and unwanted reduction in thickness of the tool along one side of the tool blank.

In accordance with the present invention, the cutting faces of tools are provided with compound side rake angles which serve to maintain desired tool thickness while at the same time providing the requisite geometry for cutting certain types of materials. The compound rake angles which are provided comprise two or more planar surfaces formed along the length of the cutting face of the tool, and these surfaces are related to one another in specific ways which provide for improved cutting action, better tool strength, and, in some cases, better control of chip formation and removal of chips from the tooth slot being formed.

The planar surfaces which are formed on the tools of this invention do not require resharpening at the time the tool is resharpened, and this permits the use of metallurgical or coating treatments on such surfaces for improving tool life and cutting action. In addition, the surfaces can be formed very easily on tools at the time of original manufacture without a requirement for highly sophisticated equipment for such manufacture.

In accordance with a specific embodiment of the present invention, a gear cutting tool is provided with a cutting face having a compound side rake angle formed in the tool for all or part of the length of the tool. The compound side rake angle may consist of two adjacent planar surfaces which intersect in a line parallel to a longitudinal axis of the tool, and the axis of intersection may, in certain specific applications, be positioned so as to not intersect any portion of the cutting edge of the tool. In other applications the axis of intersection may fall across a portion of the tool cutting edge.

These and other features and advantages of the present invention will become apparent in the more detailed discussion which follows, and in that discussion reference will be made to the accompanying drawings as briefly described below.

BRIEF DESCRIPTION OF DRAWINGS

FIG. 1 is a side elevational view of a single cutting tool of the type to be modified by the present invention;

FIG. 2 is a front elevational view of the cutting tool of FIG. 1;

FIG. 3 is a top end view of the cutting tool depicted in FIGS. 1 and 2;

FIG. 4 is a view of a single face of a portion of a gear, showing a typical tooth slot profile that might be formed with the tools of the present invention.

FIG. 5 is an enlarged front elevational view of just the cutting end of a cutting tool of the type shown in FIG. 2, in accordance with a first embodiment of the present invention;

FIG. 6 is a top end view of the cutting tool shown in FIG. 5;

DETAILED DESCRIPTION OF INVENTION

Figure 8:
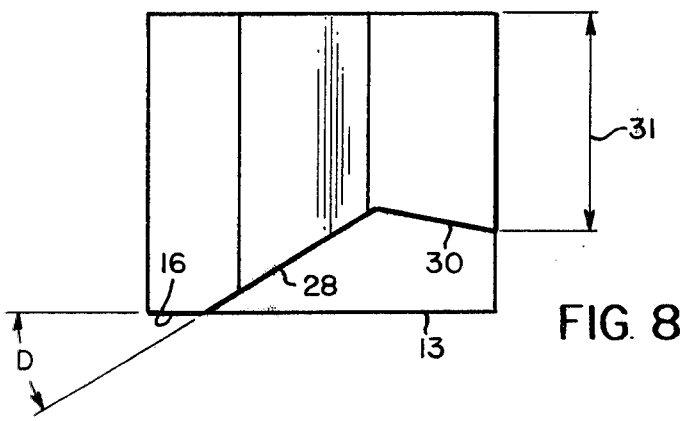
FIG. 8 is a top end view of the cutting tool shown in FIG. 7.

Referring to FIGS. 1-3, it can be seen that the cutting tool of this invention is of the type which can be formed from bar stock having a rectangular cross-sectional configuration. Each tool has a base end 10 and a cutting end 12. The cutting end 12 includes a profile (as shown in FIG. 2) for defining a clearance angle A and a pressure angle B. In addition, an end angle C (as shown in FIG. 1) is formed at the cutting end of the tool. Known tools of this type also include a built-in side rake angle D (FIG. 3) which can be formed by grinding off a front wall 13 of the tool for whatever length is desired. This forms a cutting face (or chip face) 14 which extends down to the base portion 10 of the tool, and it can be seen that a narrow portion 16 of the front wall 13 of the tool is left unground for the purpose of positioning and clamping the tool within a radial slot of a cutterhead of the type shown, for example, in U.S. Pat. No. 4,060,881. This feature is also shown in that same patent.

FIG. 4 illustrates a sidewall 25, a fillet 27, and a bottom portion 29 of a typical tooth slot that might be formed with the tools of this invention.

The cutting edge 18 of the illustrated tool is defined by the intersection of the cutting face 14 and the end of the tool that is ground off to develop the pressure angle B and the profile of the tool. In the illustrated embodiments, the cutting edge 18 is of the type designed to cut both the sidewall 25 (FIG. 4) and the bottom portion 29 of a tooth slot, however, other designs may provide for only sidewall or only bottom cutting of the tooth slot. The full extent of the cutting edge 18 can be appreciated from the views of FIG. 5 in which there is depicted a first part 20 of the cutting edge for cutting the side of a slot in a workpiece and a second part 22 for cutting the bottom portion of a slot in a workpiece. Between the parts 20 and 22 is a radius 24 which provides a smooth profile for the development of the fillet 27 between the sidewall and bottom portion of a tooth slot in a workpiece.

FIGS. 5 and 6 illustrate details of a first embodiment of the present invention wherein two angular planar surfaces 28 and 30 intersect along a line 26 which preferably falls completely outside of the range of the cutting edge 18 of the tool so as to avoid any interference with the cutting action of the edge. It can be seen that the planar surface 30 preserves a substantial thickness of the tool body at 31, which would not be possible if only a single rake angle were formed by an extension of the planar surface 28 (see dashed line, FIG. 6). The angular planar surfaces 28 and 30 are formed axially along the entire length of the cutting face 14 of the tool and can be formed by grinding away the front face of the tool. This provides a preferred rake angle D (see FIG. 6) which in the illustrated embodiment is 30 degrees and is suitable for cutting relatively soft steel (for example, less than 150 Brinell hardness). With this relationship, it is possible to provide a desired steeper rake angle D for cutting the side and bottom portion of a tooth slot in a workpiece consisting of a softer material than could be cut with a more conventional side rake angle for this type of tooling. In addition, this is accomplished in a way that maintains as much thickness as possible in the region of the tool at 31 while obtaining a greater clearance for chip flow across the face of the tool which includes clearance angle A.

Figure 7:
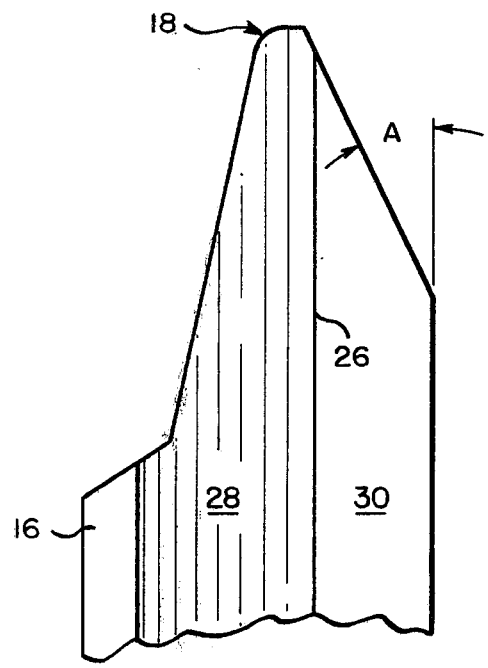
FIG. 7 is a front elevational view of just the cutting end of a second embodiment of a cutting tool in accordance with the present invention.

As an example of a working embodiment of the cutting tool shown in FIGS. 5 and 6, tools having the following characteristics have been designed:

Material: High Speed Steel
Length: 4.025 inches
Width: 0.450 inches
Thickness: 0.380 inches
Angle A: 23°30′ to 0°10′
Angle B: 14°–28°30′
Angle C: 24°
Angle D: 30°
Radius 24: 0.050 inches FIGS. 7 and 8 illustrate a second embodiment of the invention. In this embodiment, the line 26, defining the intersection between planar surfaces 28 and 30, again falls in a position which avoids any interference with the cutting edge 18 of the tool. Such a position is preferred for any tool manufactured in accordance with this invention but cannot always be used (as is the case of the embodiments of FIGS. 9–12) where tool geometry prevents such a location. The planar surface 30 of the embodiment of FIGS. 7 and 8 is at a reverse angle to the front face 13 of the tool and provides an even greater thickness of tool at 31 than does the embodiment of FIGS. 5 and 6. The side rake angle D, of the embodiment of FIGS. 7 and 8 is 30 degrees. Unlike the V-shaped face shown in U.S. Pat. No. 3,354,525 (commonly owned herewith), the V-shape of this tool is formed away from the cutting edge of the tool to thereby avoid problems of chips "packing" into the V-part of the tool face.

Figure 10:
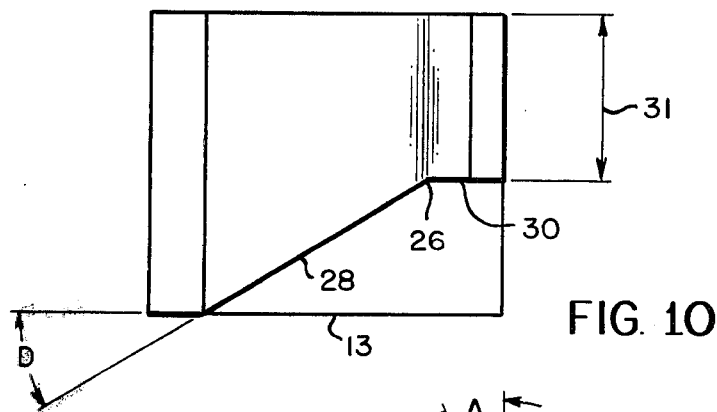
FIG. 10 is a top end view of the cutting tool shown in FIG. 9.
Figure 9:
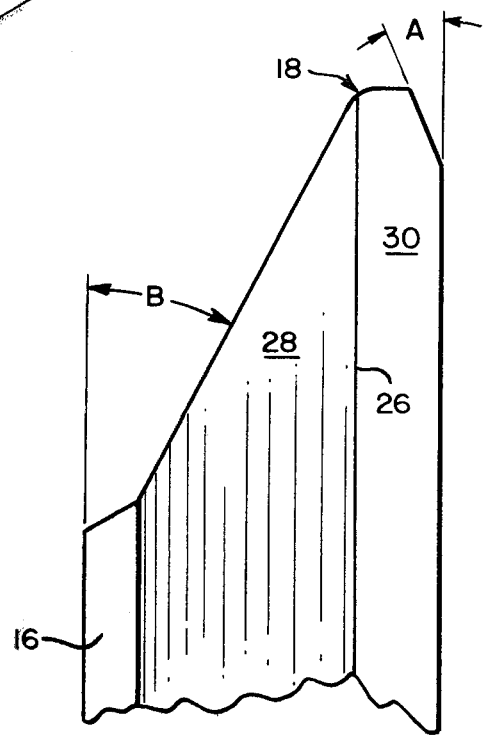
FIG. 9 is a front elevational view of just the cutting end of a third embodiment of a cutting tool in accordance with the present invention.

The embodiment of FIGS. 9 and 10, illustrates the possibility of having to place the intersection line 26 in a position which passes through a portion of the cutting edge 18. This is necessary because of the relatively large pressure angle B required for the specific tool shown. In the case of tools designed to cut both the sidewall and bottom portion of a tooth slot, it is preferable to place the line 26 between the part of the cutting edge cutting the sidewall and the part of the cutting edge cutting the bottom of the slot (assuming, of course, that placement cannot be made completely away from the cutting edge as in the embodiments of FIGS. 5–8). Placement of the intersection line 26 between the bottom part 22 and the side part 20 of the tool cutting edge provides, in some applications, a desired chip control feature which tends to separate chips forming along the side, fillet and bottom portions of the tooth slot. When this feature is not needed, or cannot be obtained, the intersection line can be allowed to fall towards the clearance angle side of the tool and completely away from the cutting edge of the tool to thereby provide a single desired rake angle for the entire cutting edge of the tool.

Figure 12:
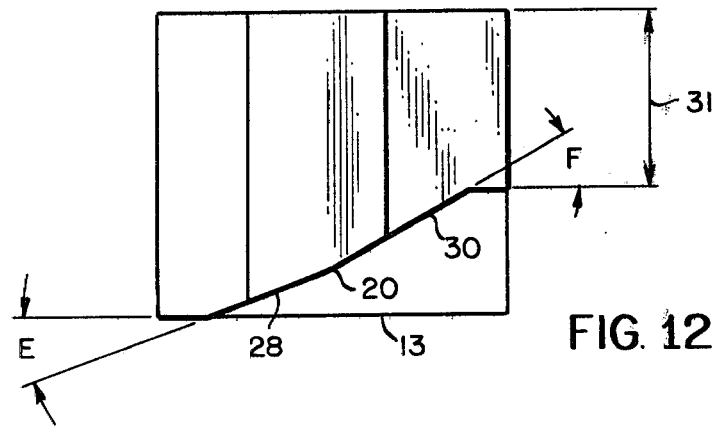
FIG. 12 is a top end view of the cutting tool shown in FIG. 11.
Figure 11:
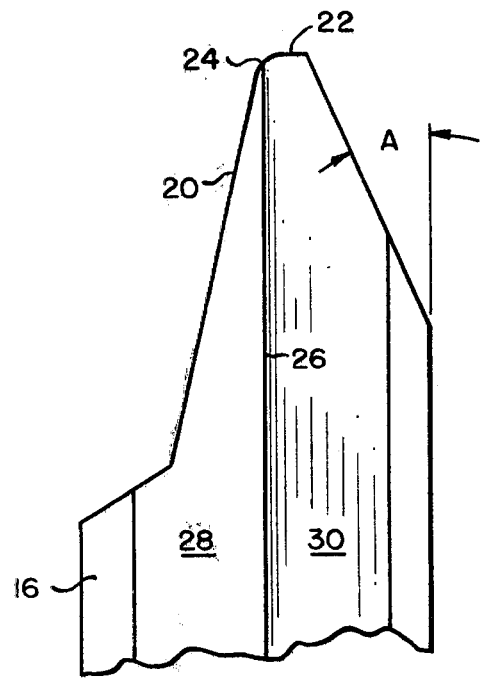
FIG. 11 is a front elevational view of just the cutting end of a fourth embodiment of a cutting tool in accordance with the present invention.

FIGS. 11 and 12 illustrate a variation of tool design having a first rake angle E and a second rake angle F. This is done to provide maximum clearance for chips across the face of the tool (towards its clearance angle side), and it may be preferred in certain applications to move the line 26 substantially toward the clearance angle side to avoid any unwanted chip "packing" in the cutting area of the tooth. In this embodiment the angle E is 20 degrees while the angle F is 30 degrees, thereby providing a steeper side rake angle only for the part of the cutting edge that is cutting the bottom of the tooth slot.

Although this invention has been described with reference to several embodiments, it can be appreciated that its principles can be applied to fully equivalent variations thereof. For example, the planar surfaces may be placed at different angles than any of those shown. The illustrated tools show a cutting face 14 which is ground into the tool for less than the full length thereof, and this is to provide a substantial base portion 10 that can be secured and clamped in a cutterhead body, however, it is possible to extend the built-in rake angles along the entire length of the tool, if desired. All such equivalent structures and variations are intended to be included within the scope of the claims as defined below.

What is claimed is:

1. In a cutting tool of the type which includes a cutting end having a cutting edge defined by the intersection of a cutting face with one side face and an end of the tool and in which the cutting end of the tool includes a profile which allows said cutting edge to engage and cut portions of both a side and a bottom of a slot being formed in a workpiece, the improvement comprising angular planar surfaces formed on said cutting face between a first part of the cutting face defining the portion of the cutting edge which serves to cut the side of the slot in a workpiece and a second part of the cutting face defining the portion of the cutting edge which serves to cut the bottom of the slot in the workpiece.

2. The improvement of claim 1 wherein said angular planar surfaces form first and second side rake angles on the cutting face of said tool.

3. The improvement of claim 2 wherein said first side rake angle is a greater angle than said second side rake angle.

4. The improvement of either of claims 1 or 2 wherein said planar surfaces comprise two surfaces which intersect along a line parallel with the longitudinal axis of the tool.

5. The improvement of claim 4 wherein said line of intersection of said planar surfaces further intersects the cutting edge of the tool at a point between the side cutting edge and the bottom cutting edge of the tool.

6. The improvement of claim 4 wherein said line of intersection of said planar surfaces intersects a part of the tool profile which is away from the cutting edge of the tool.

7. The improvement of claim 6 wherein said planar surfaces intersect to form a V-shape in the front face of the tool.

8. The improvement of claim 6 wherein said cutting face is treated to improve its cutting and wear characteristics.

9. In a gear cutting tool of the type which includes a cutting face formed at a desired side rake angle for all or a part of the length of said tool and which includes a cutting end having a profile formed thereon for defining a cutting edge between said cutting face and one side and the end of the tool, the improvement comprising a first part of said cutting edge serving to cut at least a portion of a side of a tooth slot of a gear, a second part of said cutting edge serving to cut at least a portion of a bottom of a tooth slot of a gear, and a chip control surface formed between said first and second parts of the cutting edge, said chip control surface comprising angularly displaced adjacent planar surfaces on the cutting face of the tool.

* * * * *